F. P. McCOLL AND W. W. WILLISON.
APPARATUS FOR CANNING.
APPLICATION FILED JAN. 7, 1919.
1,345,380.
Patented July 6, 1920.
2 SHEETS—SHEET 2.
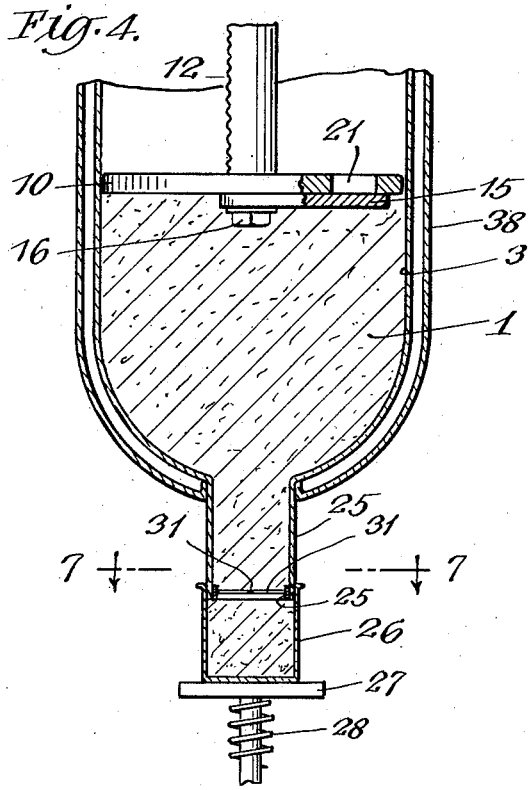
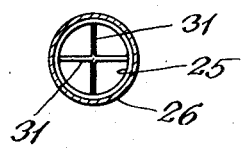
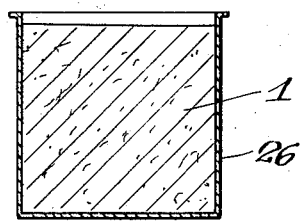
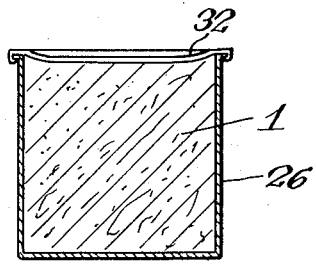

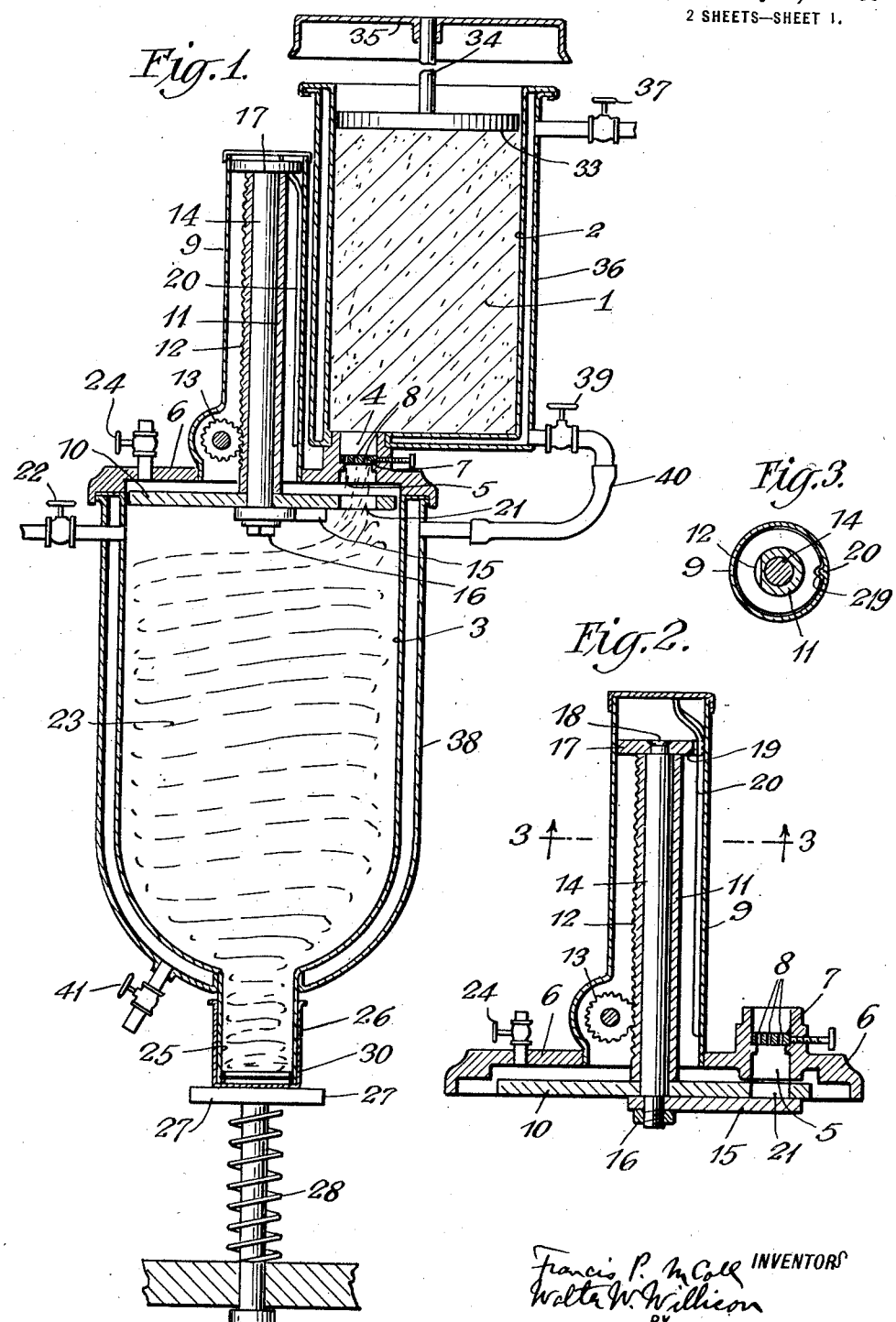

UNITED STATES PATENT OFFICE.

FRANCIS P. McCOLL, OF RIDGEWOOD, NEW JERSEY, AND WALTER WILLIAM WILLISON, OF NEW YORK, N. Y., ASSIGNORS TO THERMOKEPT PRODUCTS CORPORATION, OF NEW YORK, N. Y., A CORPORATION OF MAINE.

APPARATUS FOR CANNING.

1,345,380.   Specification of Letters Patent.   Patented July 6, 1920.

Application filed January 7, 1919. Serial No. 270,095.

*To all whom it may concern:*

Be it known that we, FRANCIS P. McCOLL, a citizen of Canada, and a resident of Ridgewood, in the county of Bergen and State of New Jersey, and WALTER WILLIAM WILLISON, a citizen of the United States, and a resident of New York, in the county of New York and State of New York, have jointly invented a certain new and useful Apparatus for Canning, of which the following is a specification.

Our invention relates to preserving food by what is commonly called canning.

More particularly our invention relates to canning food by first withdrawing the occluded air from the article to be canned so that air cannot chemically act upon the article canned to cause it to ferment, become rancid, or otherwise deleteriously affect it as a fresh and wholesome article of food.

More particularly our invention relates to treating and canning viscous alimentary substances, or substances which can be brought into a viscous condition, to the action of a vacuum sufficiently high to substantially withdraw all of its occluded air.

Our invention further relates to feeding this viscous alimentary substance into a vacuum kettle or chamber in a finely divided state, such for example as in sheets or cylinders, and withdrawing the occluded air of said alimentary substance while in said finely divided state. Then, while still in the vacuum chamber and still under a high vacuum, subject it to pressure so as to make a compact mass and close the interstices in the alimentary substances before it is fed into the receptacles in which it is to be hermetically sealed.

Our invention further relates to drawing the viscous alimentary substance from a reservoir into the vacuum kettle or chamber by the vacuum which removes substantially all its occluded air.

Our invention further relates to the apparatus and also to the canned article.

It is well known that if a viscous alimentary substance, such as butter, butter substitute, lard, or any similar alimentary substance, is canned under ordinary atmospheric pressure the occluded air will in a very short time oxidize or chemically react on the alimentary substance and render it rancid, sour, and unwholesome. This action, of course, is hastened if the can is subjected to heat corresponding to summer heat, or any other higher temperature.

In the case of butter, which has been canned under ordinary atmospheric pressure, it is well known that it will deteriorate and its structure will change even though this deterioration has not progressed to rancidity. As it deteriorates an action takes place which makes it taste "oily" and materially reduces its salability although the deterioration has not progressed to the point of rancidity.

By our invention we insure that a viscous alimentary substance be it butter, butter substitute, lard, or any other similar material, will be kept in its original, sweet and wholesome condition.

To insure perfect results we use a high vacuum preferably not less than about 28 inches, usually about 29, or as near 30 inches as we can obtain it.

Various mechanisms may be used to carry out our improved method. For purpose of description we have shown one form of apparatus whereby our method may be carried out, portions of the apparatus being somewhat diagrammatic.

In the accompanying drawing the same reference numerals refer to similar parts in the several figures.

Figure 1 is a vertical section through a vacuum kettle, reservoir, the receptacle in which the alimentary food substance is to be canned and a yielding platform.

Fig. 2 is a detail vertical section on a larger scale.

Fig. 3 is a cross-section on line 3, 3 Fig. 2.

Fig. 4 is a fragmentary view in vertical section, the same as Fig. 1, but showing the alimentary substance compressed into a solid mass and being forced into cans.

Fig. 5 is a vertical section of a filled receptacle about to be hermetically sealed.

Fig. 6 is a vertical section of a tin can such as shown in Fig. 5 hermetically sealed.

Fig. 7 is a horizontal section on line 7, 7 Fig. 1.

For purposes of description we will describe our invention as applied to treating and canning butter. The butter 1 is put into a reservoir 2, of any suitable capacity as for example of about 150 pounds, though of course this may be varied without departing from our invention. This reservoir 2 is preferably placed above the vacuum kettle or chamber 3 and communicates with it by having its opening 4 register from an opening 5 in the cover 6 of the vacuum kettle 3. Seated in the opening 4 is a removable perforated plate 7, the perforations 8, 8 varying in size and contour with the particular viscous alimentary substance to be treated.

The cover 6 has a vertical housing 9 within which is mounted a slidable piston 10 Fig. 2, having a hollow head 11, which is provided with a rack 12 to coöperate with the pinion 13, which is operated in any suitable manner as by a crank (not shown). Within this hollow head 11 of the piston 10 is rotatably mounted a shaft 14 carrying on one end a plate 15 which is secured to the shaft by a nut 16. On the other end of the shaft 14 is secured a cam plate 17 by means of the screw 18. This plate 17 is provided with a slot 19, Fig. 3, which coöperates with a spline 20 secured to the housing 9.

When the reservoir 2 is charged, the piston 10 is operated by the pinion 13 and rack 12 so as to raise the piston to the top of the vacuum kettle 3. Near the top of the housing 9 the spline 20 is curved or formed at an angle so that as the plate 17 reaches this portion of the spline it will cause the shaft 14 to be partially rotated, sufficient to remove the plate 15 from the opening 21, in the piston 10. This is the position of the parts in Fig. 1. By then operating the valve 22 leading to the vacuum pump (not shown) the air will be exhausted from the vacuum kettle 3. When a sufficiently high vacuum has been obtained therein the butter 1 will be drawn or sucked through the openings 8, 8 in the plate 7, through the opening 5 in the cap 6, and through the opening 21 in the plunger 10. The butter, then, enters the vacuum kettle 3 in a finely divided state, its exact condition depending upon the size and contour of the openings 8, 8. These perforations 8, 8 may be of any form. Preferably they are such that the butter will be fed or drawn into the vacuum kettle 3 in the form of sheets, or, in the form of cylinders, in which latter case their appearance would not be unlike macaroni.

As these sheets or cylinders of butter, or other viscous alimentary substance, are fed into the vacuum chamber 3, substantially all of their occluded air is removed by a high vacuum, preferably not less than 28 inches, usually about 29, or as near 30 as can be obtained.

After the butter has been drawn from the reservoir 2 into the vacuum kettle 3, or the vacuum kettle 3 has become filled with sheets or cylinders 23 of butter, the pinion 13 is operated so as to move the rack 12 and with it the piston 10. The first downward movement of the piston 10 will cause the plate 17 following the curved portion of the spline 20 to partially rock the shaft 14 which will cause the plate 15 to close the opening 21 in the piston. By further operating the pinion 13, the piston will move down in the vacuum kettle 3 and will compress the butter, or other viscous alimentary substance, so as to close the interstices in said substance and form it into a compact mass as shown in Fig. 4. This compression is performed in the vacuum kettle while the contents are still under the high vacuum.

After the butter 1, or any similar alimentary substance, has become compressed to the required extent, Fig. 4, the valve 22 is closed cutting out the vacuum pump and the valve 24 is opened to break the vacuum in the vacuum chamber.

The lower end of this vacuum chamber is provided with a nozzle 25 which will be sufficient size to snugly fit the receptacles 26 in which the butter, or similar alimentary substance, is to be canned. These receptacles are preferably tin cans 26. Before the butter is admitted into the vacuum chamber and before the vacuum pump is turned on, one of these tin cans 26 is placed over the nozzle 25 so as to seal said nozzle. While the alimentary substance is being vacuumized the atmospheric pressure will keep the tin can 26 upon the nozzle 25 and hold it there while the contents are being compressed by the piston 10. Preferably we also employ a platform 27 to yieldingly hold the tin can 26 on the nozzle by means of the spring 28.

After the butter, or other alimentary substance, has been compressed, and the vacuum broken by operating the valve 24, the tin cans 26 are filled to within about three eighths of an inch of the top of the cans by having the operator operate the pinion 13 which will force the compressed alimentary substance into the cans 26. When the operator sees that the top of the can 29 registers with the point 30 on the nozzle he stops operating the pinion 13 as the can will then be filled to about three eighths of an inch from its top. He then presses the can down against the action of the spring platform 27 and gives it a twisting movement so as to cut the butter and replaces the filled can 26 with an empty can. The process of filling is continued until all of the compressed and treated butter has been placed in the cans 26.

To permit the more ready separation of the butter in the cans from the butter left in the nozzle 25 we preferably mount in the end of the nozzle cross-bars 31, 31 which serve to cut the butter when the can is given a partial rotation in withdrawing it from the nozzle 25.

The cans are then fed into a vacuum canning machine where the metal caps 32 are crimped upon them in the ordinary well-known manner, while the contents of the can are again subjected to a high vacuum of from 28 to 30 inches. The small space of three-eighths of an inch at the top of the can, which space may vary for the particular size can used, is simply to permit the cover 32 to be hermetically sealed on the cans without disturbing the contents.

After all the butter in the vacuum kettle has been canned the pinion 13 is operated to raise the piston 19. At its upper extreme movement the plate 15 will be slightly rocked so as to free the opening 21 to permit additional butter to be drawn into the vacuum kettle in the manner just described.

It will be seen that by our method we remove substantially all the occluded air from the viscous alimentary substance while it is in a finely divided state, then compress it in the vaccum so as to close its interstices, in which compressed condition it is put into cans. Further, that the air has no opportunity to work into the mass of the substance in the cans before they are put through the vacuum canning machine where the alimentary substance is again subjected to a high vacuum before it is hermetically sealed.

To insure that the butter will pass uniformly through the openings 8, 8 we preferably place above it a plunger 33 which fits closely to the sides of the reservoir 2. We also preferably connect this plunger 33 with a rod 34 which carries the top 35, which seats upon the reservoir when the plunger is at the bottom of the reservoir.

If it is necessary to heat the butter, butter substitute, lard, or any similar alimentary substance to make it viscous, we may pass steam or warm water through the jacket 36 by operating the valve 37. The heating medium may be permitted to flow from the jacket 36 around the reservoir 2 to the jacket 38, around the vacuum kettle 3 by operating the valve 39 in the connection 40. The jacket 45 may be drained by operating the valve 41.

Having thus described our invention to the details of which we do not desire to be limited, what is claimed as new and what it is desired to secure by Letters Patent is set forth in the appended claims.

What we claim as our invention and desire to secure by Letters Patent is:—

1. In a vacuum apparatus the combination of a vacuum kettle a reservoir for the article to be treated and means to permit the article to be drawn or sucked from the reservoir into the vacuum kettle by the vacuum maintained in said kettle.

2. In a vacuum apparatus the combination of a vacuum kettle a reservoir for the article to be treated and means to permit the article to be drawn or sucked from the reservoir into the vacuum kettle by the vacuum maintained in said kettle, and means to compress the article in the vacuum kettle.

3. In a vacuum apparatus the combination of a vacuum kettle a reservoir for the articles to be treated and a perforated plate to permit the article to be drawn or sucked from the reservoir into the vacuum kettle by the vacuum maintained in said kettle.

4. In combination, a vacuum kettle, a reservoir, and means for rendering an article in a finely divided state in passing from the reservoir to said kettle.

FRANCIS P. McCOLL.
WALTER WILLIAM WILLISON.

Witnesses:
CHRYSTINE GLASER,
HANNAH JOSEPH.